UNITED STATES PATENT OFFICE 2,535,910

TREATMENT OF UNRENDERED FAT WITH NORDIHYDROGUAIARETIC ACID

Aladar Fonyo, La Grange, Ill., assignor to Wm. J. Stange Co., Chicago, Ill., a corporation of Illinois No Drawing. Application September 24, 1947, Serial No. 775,977

2 Claims. (Cl. 99—163)

My invention contemplates and provides a method and composition whereby and wherewith indigenous fats, such, for examples, as those in a flitch of bacon or a fish fillet, practicably and effectively may be treated with nordihydroguaiaretic acid to afford them resistance to oxidative rancidity.

During recent years nordihydroguaiaretic acid has come to be recognized as a potent and eminently satisfactory antioxidant for rendered fats. In treating a rendered fat, such, for example, as lard, with nordihydroguaiaretic acid it is standard practice to dissolve a predetermined quantity of crystals of the antioxidant in a certain comparatively small quantity of the rendered fat, and later introduce weighed or measured portions of the resultant solution into batches of the rendered fat which are being processed to afford them resistance to oxidative rancidity. But prior to my present invention, successful treatment with nordihydroguaiaretic acid of indigenous or unrendered fats such, for examples, as those resident in the tissues of a flitch of bacon, a ham, or a fish fillet, has not been possible. The reason has been the inability of nordihydroguaiaretic acid to penetrate indigenous fats with which it, either as a finely divided solid or as dissolved in a rendered fat or oil, may be brought into close contact by any or all of such procedures as rubbing, brushing, powdering, spraying or immersing the meat body in which the fat occurs.

I have discovered and demonstrated that there is a certain group of solvents for nordihydroguaiaretic acid, being compounds generally employed as emulsifiers, which, when they carry nordihydroguaiaretic acid in solution and are brought into intimate contact with the exposed surfaces of a chunk of fatty meat, enable the antioxidant functionally to penetrate or strike into the indigenous fat of the meat and accord it resistance to oxidative rancidity comparable with that resistance to oxidative rancidity which heretofore has been accorded lard and other rendered fats by placing minute quantities of nordihydroguaiaretic acid in solution with them. Such group of nordihydroguaiaretic acid solvents consists of:

(a) Sorbitan monolaurate, -palmitate, -stearate, -oleate and their polyoxyalkylene derivatives, and (b) Polyethylene glycol mono-oleate, -dioleate, -mono-stearate, -distearate.

In realizing the benefits of my invention, I prefer to make a 10% solution of nordihydroguaiaretic acid in one of the solvents (e. g., sorbitan monolaurate) of the hereinbefore identified group of solvents. This I shall call the primary solution.

For treating indigenous fats of fish meats, I then prefer to form a secondary solution by adding the aforementioned primary solution to water or brine in a concentration of from 5% to 10%; making the concentration of nordihydroguaiaretic acid in the secondary solution from .5% to 1%. Fish meats effectively may be processed, to cause their indigenous fats to become very resistant to oxidative deterioration, by immersing them in this secondary solution. For example: a substantial number of fish fillets were immersed in such secondary solution and an equal number of identical fillets were not so immersed. All of the fillets were then simultaneously frozen. The fillets which had been immersed in the secondary solution resisted oxidative rancidity approximately five times as long as did the fillets which had not been so immersed.

In treating a flitch of bacon, a ham or other body of animal meat to afford its indigenous fat resistance to oxidative deterioration, I again prefer to immerse the meat body in a secondary solution; but in this instance I find it desirable to form the secondary solution by adding from three to six ounces of the aforementioned primary solution to each five gallons of water or brine employed.

While I prefer to immerse the treated meat bodies in the secondary solution, I contemplate that such bodies may be rubbed, brushed or sprayed with the secondary solution, or that such secondary solution may be intermixed with curing salts utilized in subjecting the meat bodies to so-called "dry" cures.

The stated concentration of nordihydroguaiaretic acid in the primary solution is illustrative, not limitative. Similarly, the stated proportions of the primary solution to water or brine in the secondary solution are illustrative and not limitative.

What I claim as new and desire to secure by Letters Patent of the United States is:

1. The method of processing unrendered fats to afford them resistance to oxidative rancidity which consists in introducing into an aqueous vehicle nordihydroguaiaretic acid in a solvent therefor taken from the group which consists of sorbitan monolaurate, -palmitate, -stearate, -oleate and their polyoxyalkylene derivatives, and polyethylene glycol mono-oleate, -dioleate, -mono-stearate, -distearate, and contacting with the resultant aqueous solution exposed surfaces of uncomminuted meat bodies in which such fats occur.

2. An uncomminuted fatty meat body having its surface treated and penetrated by a composition consisting of a minor quantity of nordihydroguaiaretic acid and a major quantity of a solvent therefor taken from the group which consists of sorbitan monolaurate, -palmitate, -stearate, -oleate and their polyoxyalkylene derivatives, and polyethylene glycol mono-oleate, -dioleate, -mono-stearate, -distearate.

ALADAR FONYO.

REFERENCES CITED

The following references are of record in the file of this patent:

UNITED STATES PATENTS

| Number    | Name  | Date          |
|-----------|-------|---------------|
| 2,373,192 | Lauer | Apr. 10, 1945 |
| 2,377,610 | Brown | June 5, 1945  |